Patented Sept. 15, 1936

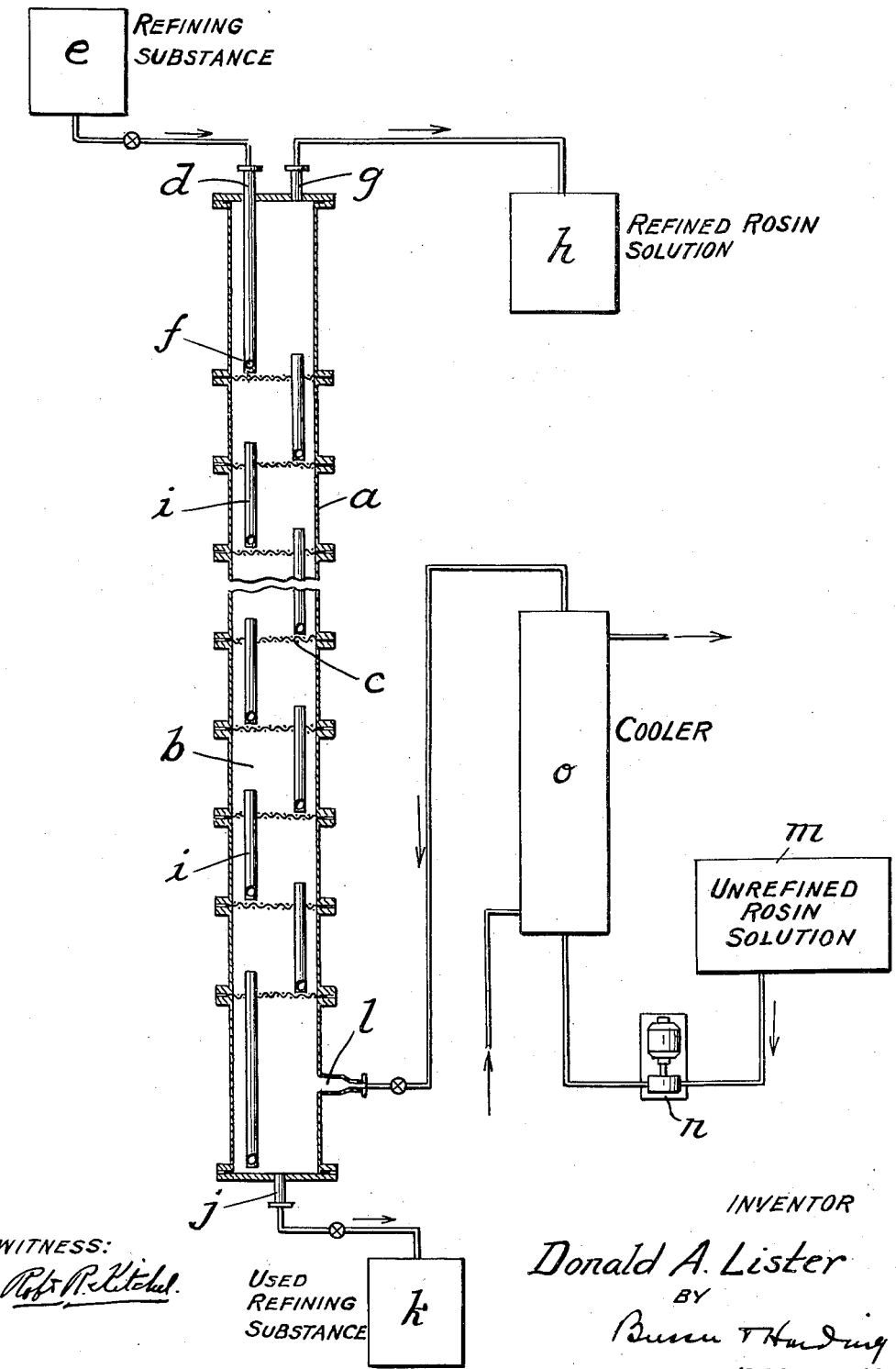

2,054,432

UNITED STATES PATENT OFFICE 2,054,432

METHOD FOR REFINING ROSIN

Donald A. Lister, Brunswick, Ga., assignor to Hercules Powder Company, Wilmington, Del., a corporation of Delaware Application August 9, 1932, Serial No. 628,044

10 Claims. (Cl. 87—2)

This invention relates to an improvement in method and apparatus for refining rosin.

The method and apparatus in accordance with this invention are adapted more especially for the refining of wood rosin, such as is extracted from dead stump wood, though it will be understood that they are likewise adaptable for the refining of gum rosin. The method and apparatus will be found efficient for refining rosin, more particularly by the removal of visible color bodies from wood and gum rosin and the removal of latent color bodies, or color bodies not normally visible but which darken in the presence of air and an alkali, from wood rosin and from the lower grades of gum rosin, which may contain latent color bodies.

Generally speaking, the method comprises counterflowing a solution of rosin in a suitable solvent with a refining substance having a higher specific gravity than that of the rosin solution, capable of substantial immiscibility with the rosin solution, and having a capacity for selectively dissolving from the rosin solution visible and/or latent color bodies when present, or of a nature to react with such color bodies to form products which are insoluble in the rosin solvent.

More particularly, the method embodying this invention involves the flowing of a rosin solution successively through a plurality of bodies of a refining substance, such as indicated, while flowing refining substance from one body to another in a direction counter to that of the flow of the rosin. The several bodies of refining substance may be of necessary or desired number and will be desirably arranged vertically with respect to one another. The flow of the rosin through the several bodies of refining substance will desirably be in stages largely under the influence of the lower gravity of the rosin solution as compared with that of the refining substance. The flow of refining substance may be in stages from body to body through downpipes.

The apparatus in accordance with this invention will comprise a tower or column of suitable height divided into a plurality of chambers by means of horizontal plates or partitions, which may desirably be made of a fine mesh screening of such character as to permit passage of the rosin solution, while at the same time holding the heavier gravity refining substance. As will be obvious, the partitions may be of any material, through which the rosin solution may pass and which will hold the refining substance, such for example, as metal plates minutely perforated.

The several chambers will be connected to one another by means of pipes extending from chamber to chamber. The inlet ends of the successive pipes will be preferably above the outlet ends of successive pipes and the outlets will desirably be in the sides adjacent the ends rather than in the ends. Means will be provided for the introduction of refining substance at the top of the tower, for the introduction of rosin solution at the bottom of the tower, and for drawing off refined rosin solution and spent refining substance respectively from the top and bottom of the tower.

The rosin solution for refining in accordance with this invention may, as has been indicated, be either wood or gum rosin, and the solvent may be, for example, gasoline, or other light petroleum distillate, naphtha, or the like, the particular solvent for use in any given operation will be chosen desirably with respect to having as wide a difference in gravity from the refining substance as may be practical.

The refining substance may be any substance with which the rosin solution is immiscible or capable of being rendered immiscible, as by cooling, and which is of higher gravity than the rosin solution, which will operate to remove color bodies from the rosin, as by extraction through a selective solvent action on the rosin, reaction with and precipitation of the color bodies, or the like. As illustrative, the refining substance may, for example, be a phenol, as carbolic acid, furfural, furfuryl alcohol, aniline, stannous chloride, etc.

Having now indicated, in a general way, the nature and purpose of this invention, I will proceed to a detailed description thereof with reference to the accompanying drawing in which the single figure is a diagrammatic showing of an apparatus embodying this invention in connection with the operation of which the method embodying the invention will be described illustratively in detail.

In the drawing a indicates a circular tower, which may be of any suitable diameter and height, depending upon production, degree of refining, etc., desired. Illustratively, the tower a may, for example, be of a height of about thirty feet and of a diameter of about six inches.

The tower a is divided into a plurality of chambers b by means of horizontal partitions c formed from fine mesh wire screen secured at their peripheries to the inner wall of the tower. The chambers b may be of any desired height, but in the tower described they will be desirably of a height of about eight inches, it being desirable that the top and bottom chambers be respectively substantially higher than the intermediate chambers in order to permit of the drawing of refined rosin solution and of refining substance separately from the top and bottom of the tower respectively.

A pipe $d$, connected with a source of refining substance, as a tank $e$, enters the top of the tower and extends down to a point adjacent to the partition, or plate $c$ forming the top chamber. The pipe $d$ is provided with an opening $f$ in its side adjacent the plate $c$. The tank $e$ containing a supply of refining substance, will desirably be elevated so that refining substance may flow therefrom to the tower, or a pump may be provided to raise refining substance from the tank or supply to the top of the tower.

At the top of the tower an outlet pipe $g$ for the discharge of refined rosin solution will be provided and will be connected with any suitable receiver, as a tank $h$. Downpipes $i$, $i$, provided with side outlets adjacent their lower ends will extend from chamber to chamber, their upper or inlet ends being at a distance above the plates $c$ forming the several chambers and above the side outlets of adjacent pipes.

At the bottom of the tower a pipe connected with a suitable receiver $k$ will be provided for the discharge of spent refining substance. An inlet $l$ for rosin solution to be refined will be provided at a point above the bottom of the tower.

The rosin solution to be refined may be contained in any suitable container, as a tank $m$ and may be introduced into the tower by means of a pump $n$, or the tank $m$ may be elevated so that the rosin solution will flow up through the tower. A cooler $o$ is provided for cooling the rosin solution before it enters the tower to a temperature at which its immiscibility with the refining substance will be promoted.

As illustrative of the carrying out of the method in accordance with this invention with the use of the apparatus described above, using, for example, ordinary phenol or carbolic acid as the refining substance for the refining of, for example, a solution of rosin in gasoline, the tank $e$ is charged with a solution of phenol in water of a concentration of say 70%–80% phenol and the tank $m$ is charged with a gasoline-rosin solution containing 10%–20% of rosin.

The phenol solution is desirably permitted to flow into the tower or column and from chamber to chamber therein until the level of the bodies of phenol in the several chambers stands at or slightly above the tops of the downpipes $i$. While continuing to flow phenol into the tower and which passes from body to body in the several chambers through the pipes $i$, gasoline-rosin solution is pumped or flowed into the bottom of the chamber. The gasoline-rosin solution will rise in the tower, passing through the plates $c$ and into and through the bodies of phenol in the several chambers. Care should be exercised in avoiding passage of the rosin solution into the tower at a rate in excess of the capacity of the tower and of the rate of gravital separation of the rosin solution from the several bodies of phenol in order that phenol will not be forced out of the tower at the top or bottom.

The rosin solution on reaching the top of the tower and having passed through the several bodies of phenol, will be highly refined, by the removal of color bodies extracted by the phenol, and will be drawn from the top of the tower into the receiver $h$. The phenol, having passed by stages from body to body to the bottom of the tower is drawn off through pipe $j$.

As further illustrative, for example, the method in accordance with this invention may be carried out following the above described procedure using, for example, furfural in place of phenol solution described and a gasoline-rosin solution of say 15%–25% concentration.

As will be appreciated, various modifications may be made in the apparatus and method as described herein in detail for illustrative purposes without departing from the scope of this invention.

What I claim and desire to protect by Letters Patent is:

1. The method of refining rosin which includes flowing a solution of rosin successively through a plurality of separate bodies of a refining substance in a fluid state and with which the rosin solution is substantially immiscible, while by-passing refining substance directly from body to body thereof in a direction opposite to the direction of flow of the rosin solution.

2. The method of refining rosin which includes flowing a solution of rosin successively through a plurality of separate bodies of a refining substance of a higher specific gravity than that of the rosin solution in a fluid state and with which the rosin solution is substantially immiscible, while by-passing refining substance directly from body to body thereof in a direction opposite to the direction of flow of the rosin solution.

3. The method of refining rosin which includes flowing a solution of rosin in gasoline successively through a plurality of separate bodies of a phenol of a higher specific gravity than that of the rosin solution in a fluid state and with which the rosin solution is substantially immiscible, while by-passing some of the phenol directly from body to body thereof in a direction opposite to the direction of flow of the rosin solution.

4. The method of refining rosin which includes flowing a solution of rosin successively through a plurality of separate bodies of furfural of a higher specific gravity than that of the rosin solution in a fluid state and with which the rosin solution is substantially immiscible, while by-passing furfural directly from body to body thereof in a direction opposite to the direction of flow of the rosin solution.

5. The method of refining rosin containing color bodies which includes flowing a solution of rosin containing color bodies through a plurality of separate bodies of a fluid selective solvent for color bodies contained by the rosin solution, such selective solvent being substantially immiscible with the rosin solution, and bypassing selective solvent directly from body to body thereof in a direction opposite to the direction of flow of the rosin solution.

6. The method of refining rosin which includes flowing a solution of rosin in a light petroleum distillate successively through a plurality of separate bodies of a refining substance in a fluid state and with which the rosin solution is substantially immiscible, while bypassing refining substance directly from body to body thereof in a direction opposite to the direction of flow of the rosin solution.

7. The method of refining rosin which includes flowing a solution of rosin in a light petroleum distillate successively through a plurality of separate bodies of furfural of a higher specific gravity than that of the rosin solution in a fluid state and with which the rosin solution is substantially immiscible, while bypassing furfural directly from body to body thereof in a direction opposite to the direction of flow of the rosin solution.

8. The method of refining rosin which includes flowing a solution of rosin in a light petroleum distillate to a concentration of about 15–25% successively through a plurality of separate bodies of a refining substance in a fluid state and with which the rosin solution is substantially immiscible, while bypassing refining substance directly from body to body thereof in a direction opposite to the direction of flow of the rosin solution.

9. The method of refining rosin which includes flowing a solution of rosin in gasoline successively through a plurality of separate bodies of a refining substance in a fluid state and with which the rosin solution is substantially immiscible, while bypassing refining substance directly from body to body thereof in a direction opposite to the direction of flow of the rosin solution.

10. The method of refining rosin which includes flowing a solution of rosin in a light petroleum distillate successively through a plurality of separate bodies of a refining substance of a higher specific gravity than that of the rosin solution in a fluid state and with which the rosin solution is substantially immiscible, while bypassing refining substance directly from body to body thereof in a direction opposite to the direction of flow of the rosin solution.

DONALD A. LISTER.